United States Patent
An et al.

(10) Patent No.: US 12,507,058 B2
(45) Date of Patent: Dec. 23, 2025

(54) ACCESSING MULTIPLE SHARED PROFILE MANAGEMENT SERVERS VIA A SINGLE QUICK RESPONSE CODE IN WIRELESS NETWORKS

(71) Applicant: T-Mobile USA, Inc., Bellevue, WA (US)

(72) Inventors: Kyeong Hun An, Sammamish, WA (US); Mathew George, Kirkland, WA (US); Zoltan Homorodi, Bellevue, WA (US); Ryan King, Bellevue, WA (US); Nilesh Ranjan, Sammamish, WA (US); Tanmay Roy, Redmond, WA (US); Cody Lee Taylor, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 511 days.

(21) Appl. No.: 18/147,598

(22) Filed: Dec. 28, 2022

(65) Prior Publication Data
US 2024/0224025 A1    Jul. 4, 2024

(51) Int. Cl.
*H04W 8/20* (2009.01)
*H04W 12/06* (2021.01)
*H04W 12/72* (2021.01)

(52) U.S. Cl.
CPC .......... *H04W 8/205* (2013.01); *H04W 12/06* (2013.01); *H04W 12/72* (2021.01)

(58) Field of Classification Search
CPC ...... H04W 8/205; H04W 12/35; H04W 12/72
See application file for complete search history.

(56) References Cited

U.S. PATENT DOCUMENTS

| | | | |
|---|---|---|---|
| 10,356,604 B2 | 7/2019 | Namiranian | |
| 10,362,475 B2 | 7/2019 | Namiranian | |
| 10,687,204 B1 | 6/2020 | Roy et al. | |
| 10,708,759 B1 | 7/2020 | Roy et al. | |
| 10,708,766 B1 | 7/2020 | Umamaheswaran et al. | |
| 10,798,564 B2 | 10/2020 | Namiranian | |

(Continued)

FOREIGN PATENT DOCUMENTS

| | | |
|---|---|---|
| CN | 111148088 B | 12/2022 |
| EP | 3659354 A1 | 6/2020 |

*Primary Examiner* — Barry W Taylor
(74) *Attorney, Agent, or Firm* — Perkins Coie LLP (57) ABSTRACT

The disclosed technology is directed to providing an embedded subscriber identity module (eSIM) solution in a wireless telecommunication network. An example method for provisioning a wireless device with an eSIM profile for operation on a network includes a primary DP+ server receiving a first information corresponding to a mobile device. The primary DP+ server, which is communicatively coupled to a plurality of secondary DP+ servers, is accessed via network information embedded in a single quick response (QR) code that was retrieved by scanning the single QR code. The method further includes determining whether an appropriate eSIM profile is available on the primary DP+ server or one of the secondary DP+ servers. In the former case, the identified eSIM is transmitted to the mobile device, whereas in the latter case, the identified eSIM profile is received from the respective secondary DP+ server and then transmitted to the mobile device.

19 Claims, 4 Drawing Sheets

(56) References Cited

U.S. PATENT DOCUMENTS

| | | | |
|---|---|---|---|
| 10,897,690 B2 | 1/2021 | Karimli et al. | |
| 10,966,080 B1 | 3/2021 | Chen et al. | |
| 11,051,305 B1 | 6/2021 | Che et al. | |
| 11,109,220 B1 | 8/2021 | Shah et al. | |
| 11,172,406 B2 | 11/2021 | Hampali et al. | |
| 11,310,641 B2 | 4/2022 | Sicard | |
| 11,516,676 B1 | 11/2022 | Holmes | |
| 2016/0006728 A1* | 1/2016 | Park | H04W 12/06 455/411 |
| 2021/0314772 A1* | 10/2021 | Koo | H04W 4/60 |
| 2021/0392488 A1 | 12/2021 | Barry et al. | |
| 2022/0326959 A1* | 10/2022 | Lee | G06F 8/61 |
| 2022/0394484 A1 | 12/2022 | Moudhgalya et al. | |
| 2024/0048962 A1* | 2/2024 | Holla | H04W 48/16 |

\* cited by examiner

ACCESSING MULTIPLE SHARED PROFILE MANAGEMENT SERVERS VIA A SINGLE QUICK RESPONSE CODE IN WIRELESS NETWORKS

BACKGROUND

The use of Embedded Universal Integrated Circuit Cards (eUICCs), also referred to as Embedded Subscriber Identity Modules (eSIMs), is becoming increasingly prevalent in consumer wireless communication networks. Unlike a traditional UICC or SIM card that exists as a removable smart card that is transferable between multiple devices, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a mobile network operator (MNO). Other data that are stored in the eSIM profile may include carrier network information, security authentication information, a list of accessible network services, and/or so forth. The MNO may transfer an eSIM profile to the eUICC of a user device in the form of a consumer device or an M2M device via an over-the-air (OTA) update. Consumer devices are network-capable devices that are generally marketed to individual consumers. For example, these devices may include a smartphone, a tablet computer, a smartwatch, a gaming console, and/or so forth. M2M devices are networked machines that use the telecommunication services provided by the MNO to communicate with other networked machines. For example, an M2M monitoring device that is embedded on a vehicle may automatically send vehicle tracking and operation information to a remote support device at a control center. In another example, an M2M device in the form of a smart home appliance may automatically send diagnostic information to a monitoring device at a service center in case of device malfunction. Accordingly, an MNO has to have a readily available inventory of eSIM profiles for downloading and installation into the eUICC of user devices.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In Fifth Generation (5G) networks, a mobile network operator (MNO) typically uses remote SIM provisioning (RSP) platforms that are operated by third parties to provision the eSIM profiles to the eUICCs (or eSIMs) of user devices. In many instances, an RSP platform may be provided by an eSIM profile vendor that operates a GSM Association (GSMA)-certified data center. In an example, a user device sets up a contract with their chosen MNO, and receives instructions on how to connect their device to the operator's RSP system, e.g., by scanning a QR code that contains the address of the RSP system (an SM-DP+ server within the GSMA specifications), which allows the device to connect to that system and securely download a SIM profile. Once the profile is installed and activated, the device is able to connect to and operate within the MNO's network.

However, as described above, a single static QR code is typically configured to provide the address of a single SM-DP+ server (also referred to as a DP+ server). This results in a tight coupling between the QR code and the respective DP+ server, which results in implementation inefficiencies as the number of subscribers (or users) supported by the MNO increases. Requiring a user to access the single DP+ server tied to the QR code scanned by the user device restricts the MNO's ability to optimally (and intelligently) distribute eSIMs across multiple DP+ servers based on the number of requests, the likely use case scenarios, and the like.

Embodiments of the disclosed technology relate to providing an embedded subscriber identity module (eSIM) solution in a wireless telecommunication network that can access multiple DP+ servers via a single static QR code. For example, QR codes in the described embodiments are embedded with the address of a primary DP+ server, which is communicatively coupled to multiple secondary DP+ servers. The Local Profile Assistant (LPA) on the user device accesses the primary DP+ server, which in turn, accesses the multiple secondary DP+ servers, which results in efficiently identifying an appropriate eSIM profile for the user device on the primary or any of the secondary DP+ servers despite the user device accessing a static QR code with a single embedded network address. The identified eSIM profile can then be downloaded to enable the user device to access and operate on the wireless telecommunication network.

In particular, a method for providing an embedded subscriber identity module (eSIM) solution in a wireless telecommunication network includes a primary profile management server receiving a first information corresponding to a mobile device operating in the wireless telecommunication network. The primary profile management server is in communication with a plurality of secondary profile management servers, and the profile management server and the plurality of secondary profile management servers each store one or more eSIM profiles, with each eSIM profile being configured to authenticate a corresponding mobile device for use in the wireless telecommunication network. In this example, the network address of the primary profile management server, which enables its access, is embedded in a single QR code and is retrieved, for example, by scanning the single QR code using a QR code reader on the mobile device. The single QR code may include a URL for the primary DP+ server that is translated to an IP address before accessing the primary DP+ server. Alternatively, the single QR code may include the IP address, which can directly be used to access the primary DP+ server. The method further includes determining, based on the first information, whether an appropriate eSIM profile for the mobile device is available on the primary profile management server. If the eSIM profile is available on the primary profile management server, this identified eSIM profile is transmitted to the mobile device to authenticate the mobile device and enable its use on the wireless telecommunication network. In an example, the eSIM profile is identified based on the first information. However, if the appropriate eSIM profile is not available on the primary profile management server, the method further includes determining whether the profile is available on any one of the plurality of secondary profile management servers. When the appropriate eSIM profile is identified on one of the secondary profile management servers, the method then receives, from the respective secondary profile management server, the identified eSIM profile, and transmits the identified eSIM profile to the mobile device. The mobile device is now able to access and operate on the wireless telecommunication network.

In another example, a system operated by a wireless service provider for providing an embedded subscriber identity module (eSIM) solution in a wireless telecommunication network includes a primary profile management server and a plurality of secondary profile management servers that are communicatively coupled to the primary profile management server. In this example, the primary profile management server and the plurality of secondary profile management servers each store one or more eSIM profiles, with each eSIM profile being configured to authenticate a corresponding mobile device. The primary profile management server includes a hardware processor and a non-transitory memory storing instructions, which, when executed by the hardware processor, cause the system to receive a first information corresponding to a mobile device. Herein, the mobile device is configured to access the primary profile management server using information is embedded in a single quick response (QR) code, which is retrieved by scanning the single QR code. The system then determines, based on the first information, whether an appropriate eSIM profile for the mobile device is available on the primary profile management server. If the eSIM profile is available on the primary profile management server, this identified eSIM profile is transmitted to the mobile device. However, if the appropriate eSIM profile is not available on the primary profile management server, the system determines whether the profile is available on any one of the plurality of secondary profile management servers. When the appropriate eSIM profile is identified on one of the secondary profile management servers, the primary profile management server received the identified eSIM profile from the respective second profile management server, and transmits it to the mobile device. Having received the appropriate eSIM profile, the mobile device can now access and use the wireless telecommunication network.

In yet another example, at least one non-transitory computer-readable storage medium stores instructions to provide an embedded subscriber identity module (eSIM) solution in a wireless telecommunication network, the instructions, when executed by at least one data processor of a system (e.g., the primary data server), cause the system to receive a first information corresponding to a user equipment operating in the wireless telecommunication network. In this example, the primary data server, which is communicatively coupled to a plurality of secondary data servers, is accessed by the user equipment through information embedded in a single machine-readable optical label that is retrieved by accessing the single machine-readable optical label. In this example, the primary data server and the plurality of secondary data servers each store one or more eSIM profiles, with each eSIM profile being configured to authenticate a corresponding user equipment for use in the wireless telecommunication network. The instructions further cause the system, in response to determining, based on the first information, that an appropriate eSIM profile is available on the primary data server, to transmit the determined eSIM profile to the user equipment. Alternatively, in response to determining, based on the first information, that the appropriate eSIM profile is not available on the primary data server, determine that the eSIM profile is available on one of the plurality of secondary data servers. Upon determining which secondary data server is storing the eSIM profile, the instructions cause the system to receive, from the respective secondary data server, the determined eSIM profile, and transmit, to the user equipment, the determined eSIM profile. Having received the appropriate eSIM profile, the mobile device can now access and use the wireless telecommunication network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
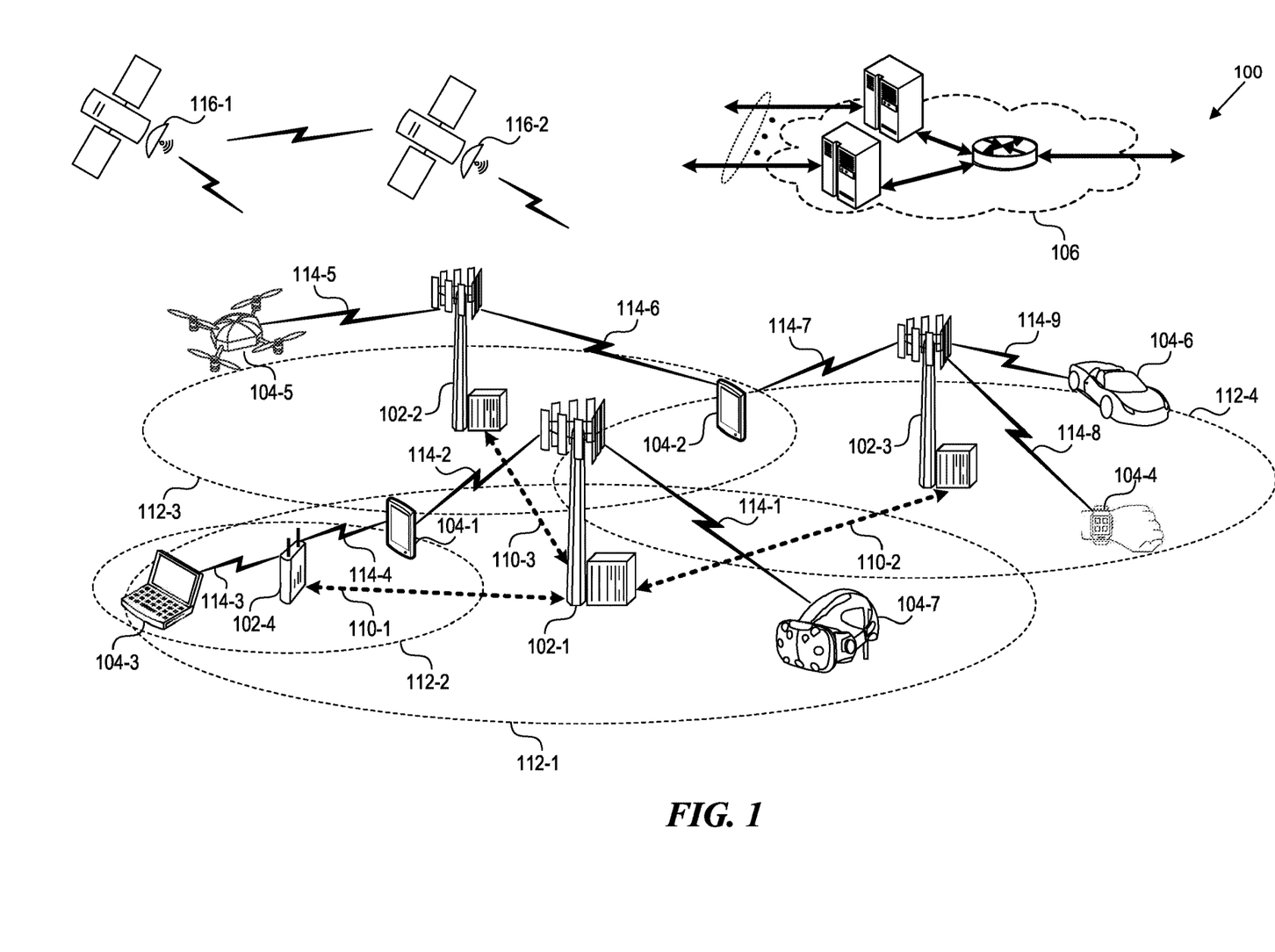
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

The network 100 can implement 6G, which is the sixth-generation standard and successor to 5G. Examples of 6G technologies include broadband cellular networks, increased densification, and/or increased diversification. In another example of 6G, the network 100 enables terrestrial and non-terrestrial transmissions, where a non-terrestrial network (NTN) is enabled by satellites 116-1 and 116-2 to deliver communications services anywhere, and can also provide coverage in areas that are unreachable by a conventional terrestrial network (TN). In yet another example of 6G, the network 100 can implement terahertz (THz) communications. This will support wireless applications that demand ultrahigh quality of service requirements and multi-terabits per second data transmission, such as terabit-per-second backhaul systems, ultrahigh-definition content streaming among mobile devices, AR/VR technology (e.g., creating a virtual presence in the metaverse), and wireless high-bandwidth secure communications.

Accessing Multiple Shared DP+ Servers Using a Single Static QR Code

Existing implementations of eSIM provisioning typically include a wireless device scanning a QR code to extract the address of a single DP+ server, which is accessed by the Local Profile Assistant (LPA) in the wireless device and enables the downloading of a profile from the DP+ server. There is typically a one-to-one correspondence between a QR code and a DP+ server and the LPA is configured to access a single DP+ server.

An SM-DP+ server, also referred to as a profile management server or data server, is responsible for the creation, download, remote management (e.g., enable, disable, update, delete), and the protection of the eSIM profile.

An LPA is a set of functions in a wireless device that is responsible for providing the capability to download encrypted profiles to the eSIM in the wireless device, thereby provisioning the wireless device 204 to operate on the network. The LPA is further configured to present the local management end user interface to the user so they can manage the status of one or more profiles on the eSIM.

Figure 2:
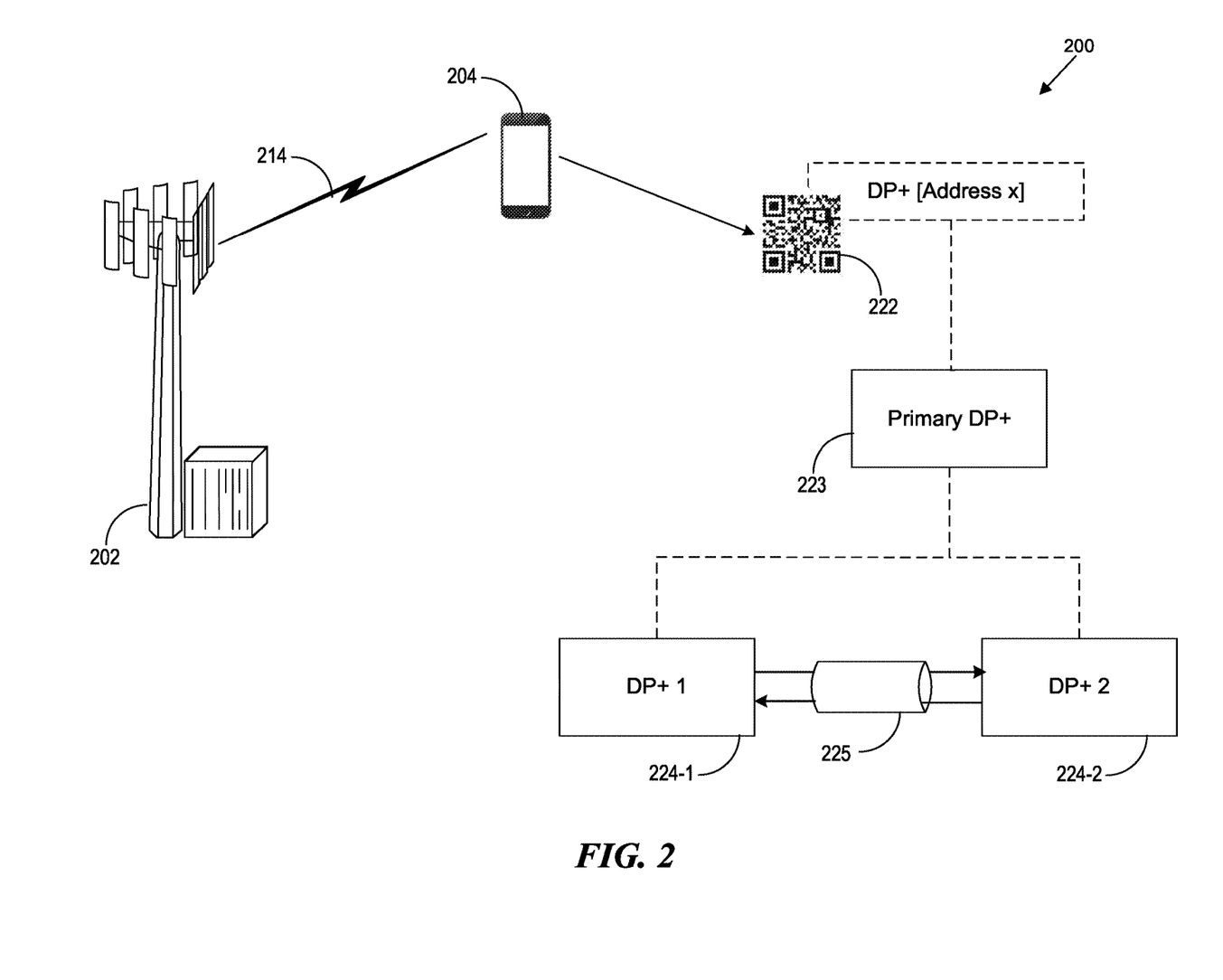
FIG. 2 is a block diagram that illustrates a system for providing an embedded subscriber identity module (eSIM) solution in a wireless telecommunication network, in accordance with implementations of the present technology.

FIG. 2 is a block diagram that illustrates a system 200 for providing an embedded subscriber identity module (eSIM) solution in a wireless telecommunication network, in accordance with the disclosed embodiments. In some implementations, and referencing the description of FIG. 1, the base station 202 and the wireless device 204 are configured to perform bidirectional communications over the communication link 214. In this example, the wireless device 204 is configured with an eSIM that must be provisioned to operate on the network that includes base station 202 by downloading an eSIM profile that enables the operation on the network.

As shown in FIG. 2, the wireless device 204 is configured to scan a QR code 222, e.g., using the in-built camera function of the wireless device, that has a DP+ address for a primary profile management server (or primary DP+ server) 223 embedded therein. In an example, the address is embedded as a Uniform Resource Locator (URL).

Scanning the QR code 222 extracts the DP+ address embedded therein, which enables the wireless device 204 to access the primary DP+ server 223. The primary DP+ server 223 is communicatively coupled to multiple secondary DP+ servers, e.g., at least the (DP+1) server 224-1 and the (DP+2) server 224-2. In an example, the (DP+1) server 224-1 and the (DP+2) server 224-2 are configured to communicate through a secure tunnel 225. In this example, the LPA relies on the single DP+ address scanned from the QR code, but can receive an eSIM profile from either the primary DP+ server 223 or one of the multiple secondary DP+ servers.

The primary DP+ server 223 can access each of the multiple secondary DP+ servers in different ways. In an example, the secondary DP+ servers are accessed in ascending (or descending) order of an identifier associated with the servers. In another example, the secondary DP+ servers are accessed based on a connectivity metric, e.g., a more robust communication link between the primary DP+ server 223 and the (DP+2) server 224-2 as compared to the communication link to the (DP+1) server 224-1 will result in the (DP+2) server being accessed first. In yet another example, a subset of the multiple secondary DP+ servers are accessed based on a list of preferred servers, e.g., as described in US 2021/0250751 entitled "RSP Platform Selection for Providing eSIM Profiles to User Devices," which is incorporated by reference, in its entirety, as part of this patent document. In yet another example, iteratively accessing the multiple secondary DP+ servers is based on the methods described in U.S. Pat. No. 10,687,204 entitled "Intelligent SIM Profile Procurement," which is incorporated by reference, in its entirety, as part of this patent document. In yet another example, the access order is based on comparing the service features and parameters of each of the multiple secondary DP+ servers, e.g., as described in U.S. Pat. No. 10,939,268 entitled "Meta RSP Interface Platform for eSIM Profile Distribution," which is incorporated by reference, in its entirety, as part of this patent document.

The disclosed embodiments provide, inter alia, the following advantages and benefits over existing implementations:

using a QR code embedded with a single DP+ address obviates the need to upgrade or modify the LPA on the mobile device, which provides a seamless experience to the user;

enables the MNO to slice eSIM traffic (e.g., eSIM download requests) based on use case and distribute the traffic across the primary DP+ server and the multiple secondary DP+ servers;

using a single static QR code with the address of a primary DP+ server, which communicates with multiple secondary DP+ servers, eliminates the need to use dynamic QR codes;

enables different vendors and/or platforms to provide each of the multiple secondary DP+ servers while maintaining the existing eSIM provisioning process, which is typically performed by the user or a customer service representative; and enables profile sharing between partner platforms.

In some implementations, accessing multiple secondary DP+ servers using the primary DP+ server enables a user device to be provisioned with an appropriate eSIM profile because the user device is not restricted to the eSIM profiles that are available on the single primary DP+ server. In an example, an extensive profile is provided to a user with an iPhone® 8 (as compared to a user with an iPhone 5) so as to be able to use the additional functionality on a more recent wireless device. In another example, a prepaid phone is provisioned with a "skinny" profile to mitigate the possibility that the limited data cap is inadvertently exceeded.

The specific eSIM profile that is downloaded to a user device may be selected based on an International Mobile Equipment Identity (IMEI) identifier, which is reflective of the capabilities of the wireless device. Alternatively, the eSIM profile may be selected based on specific capabilities or hardware configurations of the wireless device, e.g., operating band, support for different wireless protocols, and the like.

Although the examples and embodiments above have been discussed in the context of eSIMs and 5G networks/architectures, the descriptions are not limited thereto, and are applicable to cellular networks with similar functionality (e.g., integrated SIMs or iSIMs) and infrastructure.

Figure 3:
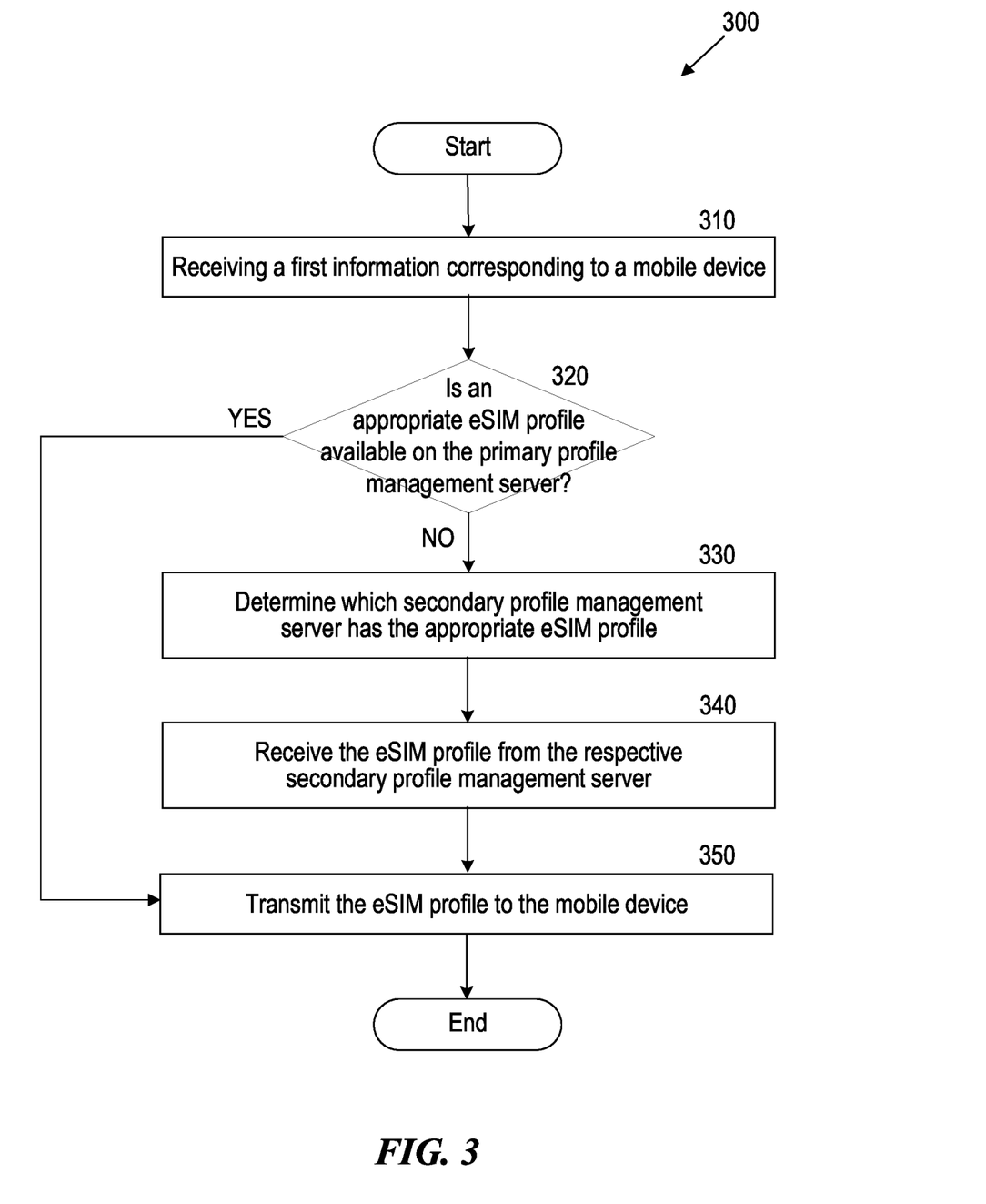
FIG. 3 is a flowchart that illustrates a process for providing an embedded subscriber identity module (eSIM) solution in a wireless telecommunication network, in accordance with implementations of the present technology.

FIG. 3 is a flowchart that illustrate a process 300 for providing an embedded subscriber identity module (eSIM) solution in a wireless telecommunication network. For example, a network server (or network node) may include the computing system 400 described with respect to FIG. 4. When the instructions are executed by the at least one hardware processor, the network node performs the process 300.

At act 310, the process includes receiving a first information corresponding to a mobile device. In an example, the first information is received by a primary profile management (or DP+) server that is accessed via its network address. The network address (e.g., an IP address) may be generated from a URL that is embedded in a static QR code.

In some implementations, the first information associated with the primary profile management server is embedded in the machine-readable optical label, and corresponds to network information for the primary profile management server. In the context of FIG. 2, the machine-readable optical label is a static QR code that includes the network information (e.g., a URL) for the primary profile management server (e.g., the primary DP+ server). More generally, the machine-readable optical label may be a one-dimensional linear barcode (e.g., discrete barcodes like Code 11, Code 39, etc., or continuous barcodes like Code 93, Code 128, etc.) or a two-dimensional matrix barcode (e.g., Aztec Code, EZCode, Data Matrix, etc.). Data embedded in the machine-readable optical label is retrieved using an optical scanner, e.g., dedicated hardware or specialized application software in conjunction with the inbuilt camera of the wireless device. In an example, the QR code with the primary DP+ address embedded therein can be scanned by the wireless device user or an MNO customer service representative.

Alternatively, the wireless device user could use the near field communication (NFC) capabilities of the wireless device to read a passive radio-frequency identification (RFID) tag that stores the primary DP+ server address (instead of scanning a barcode).

Alternatively, the MNO customer service representative could initiate the provisioning process in an MNO store or facility using a terminal (e.g., a PC or handheld device), which provides the primary DP+ server address to the wireless device.

In some implementations, the primary DP+ server and the multiple secondary DP+ servers each store one or more eSIM profiles in an encrypted form. The number of eSIM profiles stored on each of the DP+ servers is based on at least one of a number of mobile devices being served by each base station (or, alternatively, each MNO) in a coverage area, a number of eSIM profile download requests received by a base station or MNO that interfaces with one or more of the plurality of DP+ servers, or contextual data (e.g., a concert or sporting event occurring nearby, which is likely to require extensive eSIM profiles for many users).

At act 320, the process includes determining whether an appropriate eSIM profile for the mobile device is available on the primary DP+ server. In an example, an eSIM profile is appropriate for a mobile device if it enables and/or configures all the features of the device to be used. An eSIM profile that was designed for a smartphone (e.g., the iPhone®) being used in a feature-phone (e.g., the Nokia® 6230i) would not be appropriate because the eSIM profile likely supported a host of features that the feature-phone could not use or exploit.

If an appropriate eSIM profile is determined (or identified) on the primary DP+ server ("YES" branch at 320), the identified eSIM profile is transmitted to the mobile device at act 350. Alternatively, if an appropriate eSIM profile is not identified on the primary DP+ server, the primary DP+ server is configured to iteratively access each of the multiple secondary DP+ servers to determine which secondary DP+ server is storing the appropriate eSIM profile, as in act 330. The plurality of secondary DP+ servers may be accessed by the primary DP+ server in an order that is based on a profile management server identifier, a preferred (or priority) list of profile management servers, a random order, or a number of eSIM profiles stored on each of the profile management servers. The eSIM profile may be identified based on the first information, which includes at least one of an International Mobile Equipment Identity (IMEI) identifier, an operating band of the mobile device, or a hardware configuration of the wireless device.

In some implementations, the identified eSIM profile includes two or more eSIM profiles that can be used by the same wireless device. For example, a wireless device may be provisioned, by default, to use a first eSIM profile to access a first network, and further configured to switch to a second eSIM profile in order to access work documents on the wireless device, which may require an added level of security. Alternatively, the user can switch between the two or more eSIM profiles based on specific applications running on the wireless device, a location, the time of day, and the like.

Upon determining which secondary DP+ server is storing the appropriate eSIM profile, the process further includes, at act 340, receiving, from the respective secondary DP+ server, the identified eSIM profile, and at act 350, transmitting, to the mobile device, the identified eSIM profile. In an example, downloading the identified eSIM profile to the wireless device from the respective DP+ server leverages end-to-end encryption between the DP+ server and the wireless device (e.g., a public-private key pair that uses elliptic curve cryptography).

Computer System

Figure 4:
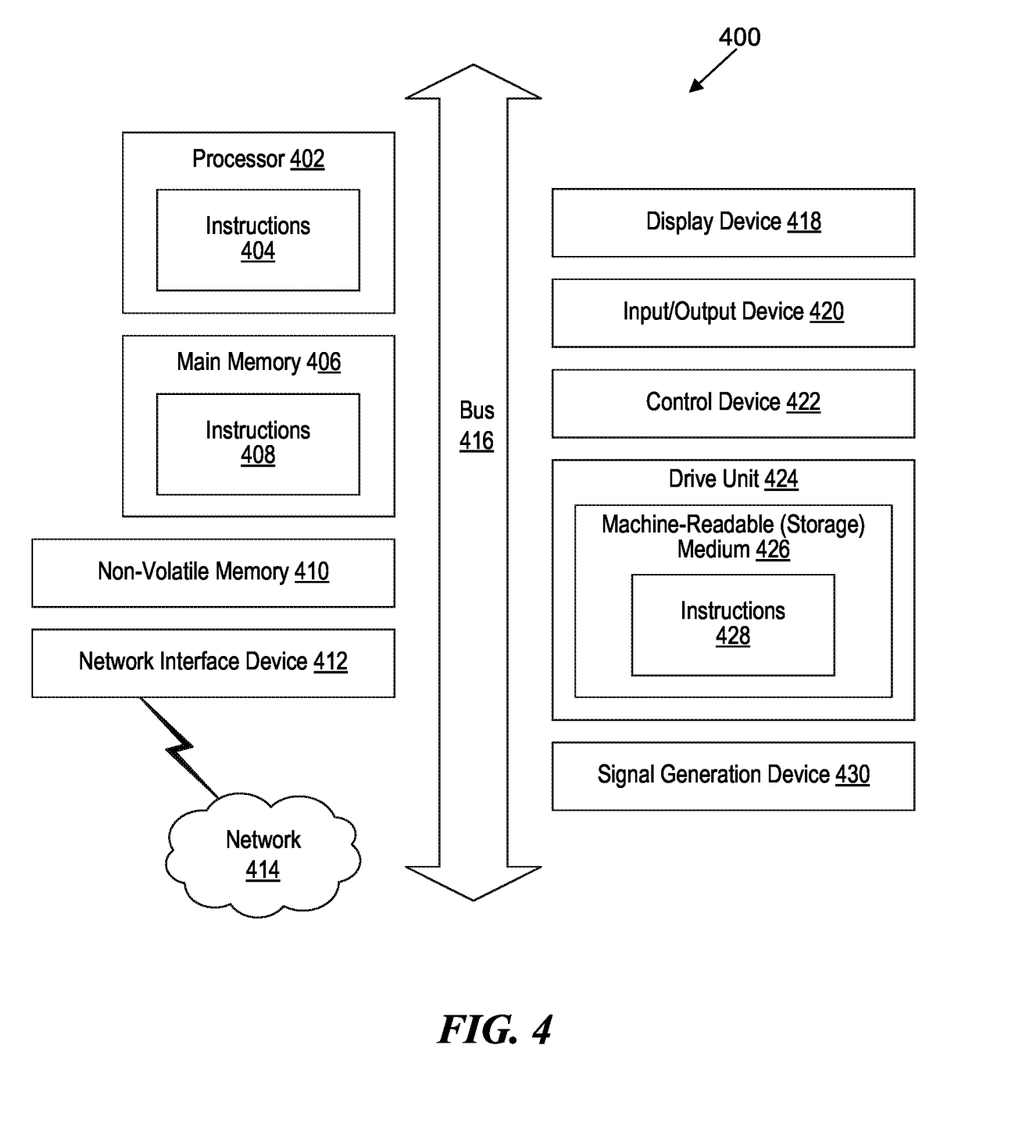
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computing system 400 can be an embedded computer system, a system-on-chip (SOC), a single-board computer system or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways.

Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method for providing an embedded subscriber identity module (eSIM) solution in a wireless telecommunication network, the method comprising:
receiving, by a primary profile management server, a first information corresponding to a mobile device operating in the wireless telecommunication network,
wherein a network address of the primary profile management server is embedded in a single quick response (QR) code and is configured to be retrieved by scanning the single QR code,
wherein the primary profile management server is communicatively coupled to a plurality of secondary profile management servers, and
wherein the primary profile management server and the plurality of secondary profile management servers each store one or more eSIM profiles,
wherein a number of the one or more eSIM profiles stored on the primary profile management server and each of the plurality of secondary profile management servers is based on a number of mobile devices being served by each base station or each telecommunication network provider in a coverage area, and
wherein each eSIM profile is configured to authenticate a corresponding mobile device for use in the wireless telecommunication network;
in response to determining, based on the first information, that an eSIM profile is available, for authenticating the mobile device for use in the wireless telecommunication network, on the primary profile management server: transmitting, to the mobile device, the determined eSIM profile; and
in response to determining, based on the first information, that the eSIM profile is not available on the primary profile management server:
determining that the eSIM profile is available on one of the plurality of secondary profile management servers,
receiving, from the respective secondary profile management server, the determined eSIM profile; and
transmitting, to the mobile device, the determined eSIM profile.

2. The method of claim 1, wherein the primary profile management server being communicatively coupled to the plurality of secondary profile management servers comprises:
determining, by the primary profile management server, a network address for each of the plurality of secondary profile management servers.

3. The method of claim 1, wherein the single QR code is a static QR code.

4. The method of claim 1, wherein the network address comprises a Uniform Resource Locator (URL) for the primary profile management server.

5. The method of claim 1, wherein at least two of the plurality of secondary profile management servers are maintained by different telecommunication network providers.

6. The method of claim 1, wherein the wireless telecommunication network is a Fifth Generation (5G) network, and wherein the primary profile management server is a Subscription Manager-Data Preparation+ (SM-DP+) server.

7. The method of claim 1, wherein the first information comprises at least one of an International Mobile Equipment Identity (IMEI) identifier, an operating band of the mobile device, or a hardware configuration of the mobile device.

8. The method of claim 1, wherein the eSIM profile comprises two or more eSIM profiles that can be used by the mobile device.

9. The method of claim 1, wherein the single QR code is scanned by a user of the mobile device or a customer service representative.

10. A system operated by a wireless service provider for providing an embedded subscriber identity module (eSIM) solution in a wireless telecommunication network, the system comprising:
a primary profile management server comprising a hardware processor and a non-transitory memory,
wherein a network address of the primary profile management server is embedded in a single quick response (QR) code and is configured to be retrieved by scanning the single QR code; and
a plurality of secondary profile management servers communicatively coupled to the primary profile management server,
wherein the primary profile management server and the plurality of secondary profile management servers each store one or more eSIM profiles, and wherein each eSIM profile is configured to authenticate a corresponding mobile device, wherein a number of the one or more eSIM profiles stored on the primary profile management server and each of the plurality of secondary profile management servers is based on a number of mobile devices being served by each base station or each telecommunication network provider in a coverage area, and wherein the non-transitory memory stores instructions, which, when executed by the hardware processor, cause the system to:

receive a first information corresponding to a mobile device, in response to determining, based on the first information, that an eSIM profile is available, for authenticating the mobile device for use in the wireless telecommunication network, on the primary profile management server:

transmit, to the mobile device, the determined eSIM profile, and in response to determining, based on the first information, that the eSIM profile is not available on the primary profile management server:

determine that the eSIM profile is available on one of the plurality of secondary profile management servers, receive, from the respective secondary profile management server, the determined eSIM profile, and transmit, to the mobile device, the determined eSIM profile.

11. The system of claim 10, wherein the single QR code is a static QR code.

12. The system of claim 10, wherein the network address comprises a Uniform Resource Locator (URL) for the primary profile management server.

13. The system of claim 10, wherein the wireless telecommunication network is a Fifth Generation (5G) network, and wherein the primary profile management server is a Subscription Manager-Data Preparation+ (SM-DP+) server.

14. The system of claim 10, wherein the first information comprises at least one of an International Mobile Equipment Identity (IMEI) identifier, an operating band of the mobile device, or a hardware configuration of the mobile device.

15. At least one non-transitory computer-readable storage medium storing instructions to provide an embedded subscriber identity module (eSIM) solution in a wireless telecommunication network, the instructions, when executed by at least one data processor of a system, causing the system to:

receive, by a primary profile management server, a first information corresponding to a user equipment operating in the wireless telecommunication network, wherein a network address of the primary profile management server is embedded in a single machine-readable optical label and is configured to be retrieved by accessing the single machine-readable optical label, wherein the primary profile management server is communicatively coupled to a plurality of secondary profile management servers, and wherein the primary profile management server and the plurality of secondary profile management servers each store one or more eSIM profiles, wherein a number of the one or more eSIM profiles stored on the primary profile management server and each of the plurality of secondary profile management servers is based on a number of mobile devices being served by each base station or each telecommunication network provider in a coverage area, and wherein each eSIM profile is configured to authenticate a corresponding user equipment for use in the wireless telecommunication network;

in response to determining, based on the first information, that an eSIM profile is available, for authenticating the user equipment for use in the wireless telecommunication network, on the primary profile management server: transmit, to the user equipment, the determined eSIM profile; and in response to determining, based on the first information, that the eSIM profile is not available on the primary profile management server:

determine that the eSIM profile is available on one of the plurality of secondary profile management servers, receive, from the respective secondary profile management server, the determined eSIM profile, and transmit, to the user equipment, the determined eSIM profile.

16. The at least one non-transitory computer-readable storage medium of claim 15, wherein the single machine-readable optical label is a single one-dimensional linear barcode or a single two-dimensional matrix barcode.

17. The at least one non-transitory computer-readable storage medium of claim 16, wherein the single two-dimensional matrix barcode is a single static quick response (QR) code.

18. The at least one non-transitory computer-readable storage medium of claim 15, wherein the single machine-readable optical label is accessed by a user of the user equipment or a customer service representative.

19. The at least one non-transitory computer-readable storage medium of claim 15, wherein the wireless telecommunication network is a Fifth Generation (5G) network, wherein the primary profile management server is a Subscription Manager-Data Preparation+ (SM-DP+) server, and wherein the first information comprises at least one of an International Mobile Equipment Identity (IMEI) identifier, an operating band of the user equipment, or a hardware configuration of the user equipment.

* * * * *